Jan. 1, 1952  S. F. McPHAIL  2,581,198
GRAIN SAVING DEVICE FOR THRESHING MACHINES
Filed Feb. 24, 1949

Inventor
Silas F. McPhail
by Douglas S. Johnson
agent

Patented Jan. 1, 1952

2,581,198

UNITED STATES PATENT OFFICE 2,581,198

GRAIN SAVING DEVICE FOR THRESHING MACHINES

Silas F. McPhail, Windsor, Ontario, Canada

Application February 24, 1949, Serial No. 78,099

3 Claims. (Cl. 130—27)

This invention relates to a device to be used with agriculture machinery such as combines, separators, threshing machines or the like, and the principal object of the invention is to provide a device which will effect more efficiently than with present devices the separation and recovery of substantially all of the loose grain thrown out with the straw by the threshing cylinder towards the straw deck to provide an important saving in the grain presently being lost with the straw.

The principal feature of the invention consists in providing a novel deflector unit to be located on the straw deck of a combine or thresher or the like in the path of the flying grain and straw delivered from the threshing cylinder and beater, the deflector unit incorporating separating and deflecting surfaces located relative the stream of flying grain and straw, to guide the straw and to deflect and guide the grain clear of the straw for recovery.

Referring to the accompanying drawings, Figure 1 is a perspective view illustrating the application of my deflector unit as used with a combine machine and illustrating its location relative the threshing cylinder and beater to effect the separation of flying grain and straw.

In present machines, including combines, threshing machines and the like, the grain is fed to a thrashing cylinder with which co-operates a concave grating to effect the shredding of the straw from the grain which then drops through the concave to a collector or grain pan. The shredded straw in turn is thrown out by the centrifugal action of the threshing cylinder onto the straw deck.

During this operation it will be appreciated that a certain percentage of the grain is trapped in the discharge straw mat and is carried to the straw deck. Normally the straw deck is reciprocally mounted to form a shaker in an attempt to recover such grain, but the amount recovered is relatively small and an important percent of the grain is actually lost with the straw as it is discharged from the straw deck.

In actual practice the grain that is trapped by the straw mat and prevented from passing through the concave to the grain pan when forcefully thrown out by the action of the threshing cylinder and beater with the straw mat, separates therefrom due to the fact that the air resistance thereto is relatively small from the air resistance presented to the straw. The path of travel of substantially all of the grain is therefore above and beyond the path of travel of the straw as it flies through the air to the straw deck.

The beating of this flying mass or mat of straw by the beater further ensures that each grain particle is loosened therefrom and is free to travel as a free projectile.

In previous machines this stream of grain has been observed flying above the stream of straw matting delivered to the straw deck but heretofore this grain has been allowed to fall back into the straw on the straw deck and the shaker action of the straw deck has been entirely relied upon to effect re-separation.

According to my invention I provide a novel deflector unit arranged above the straw deck and located relative the flying straw mat and grain from the threshing cylinder and beater that the straw is guided in one path and the grain upon reaching the end of its travel is guided either side of the straw path and completely segregated from the straw so that it may be entirely recovered.

Figure 1:
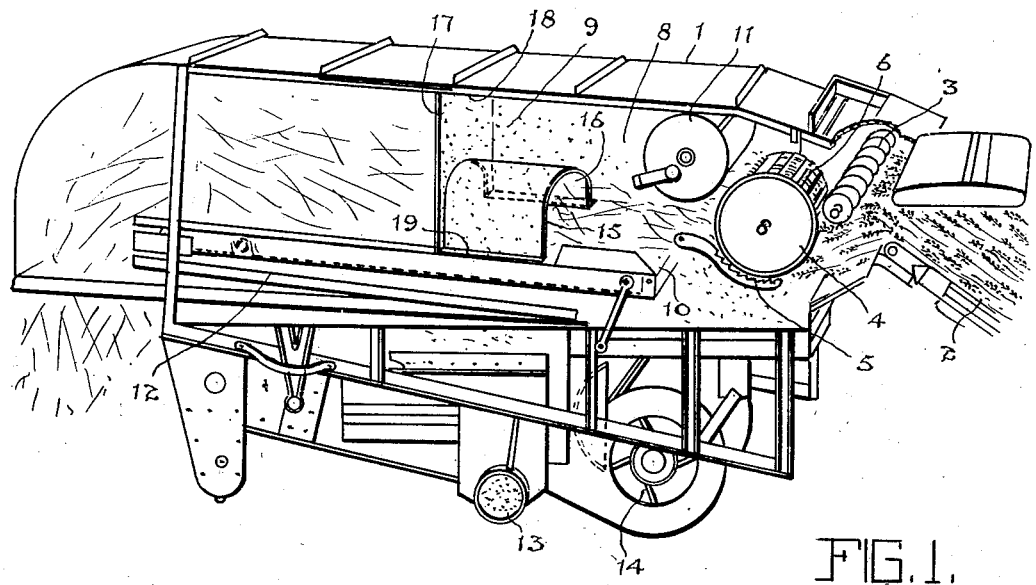

Referring to the figures, Figure 1 shows a portion of a combine or threshing machine 1 provided with a grain feed 2 and worm 3 to feed the grain to the threshing cylinder 4 with which cooperates the adjustable concave 5. The threshing cylinder is provided with the usual peripheral rasp bars 6 which co-operate with the concave to effect a shredding of the straw of the grain to effect a separation of the major portion thereof, which grain is dropped through the concave to the grain pan 7.

The straw 8 and the grain particles 9 trapped from passing through the concave by the straw mat are thrown out by the threshing cylinder 4 towards the reciprocably mounted straw deck 10, the outpassing stream of straw and grain from the threshing cylinder being agitated and broken up by the rotating beater 11.

Arranged below the straw deck is a grain return 12 to return any grain shaken through the straw deck to the grain pan as in the usual machine. Suitable pans and guides are provided to conduct the grain to the discharge 13 and the usual fan 14 is provided to blow off any loose straw particles from the grain prior to its discharge.

As such constructions are old in the art of threshing machines and combines and the like, and as the details and arrangements of the parts vary from machine to machine and form no part of the present invention, no further detailed showing of such parts are deemed required.

My novel deflector unit for use with such machines comprises an arched deflecting and guiding member or plate 15 arranged above the straw deck to extend across or straddle substantially the full width of the straw deck and to define therewith a tunnel 16.

This arched plate 15 is so spaced relative the threshing cylinder 4 and beater 11 that the straw 8, which is light and which presents a large surface for the air to resist, will settle to the straw deck or adjacent to the straw deck before reaching the tunnel 16, while the stream of grain 9 which meets relatively little resistance by the air, will be directed above and beyond the forward end of the tunnel or plate 15.

Extending upwardly from adjacent the rearward end of the arched plate 15 is a vertical partition 17 which extends the full width of the straw deck and reaches to the top 18 of the machine. This partition portion 17 forms a stop or deflector which the stream of grain 9 strikes and upon striking is deflected downwardly onto the upper surface of the arched plate 15, and this upper surface then guides the grain to either side of the straw deck around the stream of straw 8, being by-passed longitudinally of the straw deck through the tunnel 16. The grain is thus guided in complete segregation from the straw moving longitudinally of the straw deck and is therefore fully recoverable.

To facilitate the recovery of such grain openings 19 are provided in the straw deck each side of the arched plate 15 and these openings communicate with the grain pan 7 so that the grain recovered by means of my deflector unit is collected together wtih the grain recovered from the action of the threshing cylinder and concave 5.

Figure 2:
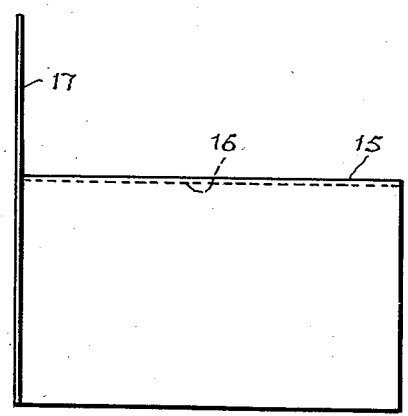
Figure 2 is a side elevational view of my deflector unit.
Figure 3:
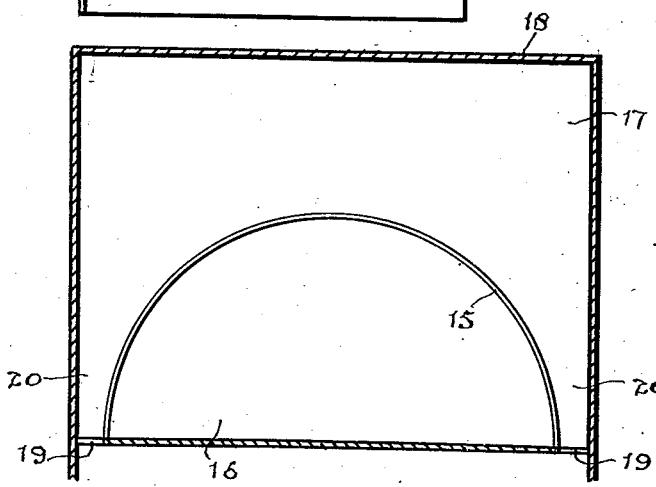
Figure 3 is an end elevational view.

Referring to Figures 2 and 3, it will be seen that my deflector unit has the arched plate 15 and vertical partition 17 formed as an integral unit with the partition 17 being shaped to the arched plate to define the leg portions 20 extending down either side of the arched plate to extend the deflector unit at the partition to the full width of the straw deck.

While the arched formation of the plate 15 is preferable, as it provides minimum resistance to the flow of the straw stream 8 therethrough, other shapes of plates, such as triangular plates, may be used to effect the segregation of the grain and the straw to guide such segregated grain either side of the straw stream passing therebeneath. Other equivalent arrangements may also be employed without departing from the scope of my invention.

While my invention is extremely simple and relies on the physical phenomena of the normal separation of the grain and straw under projection through the air, it will be appreciated that it forms a very important device for greatly increasing the yield of grain from the thrashing operation.

As an extremely simple device it forms an economical attachment which can be readily installed on all types of existing machinery with a minimum of effort and time.

What I claim as my invention is:

1. In a threshing machine or the like, including a threshing cylinder and concave therefor, a beater, a straw deck and grain pan, a tunnel-like member arranged above and extending longitudinally of the straw deck and located to present a horizontally extending transversely arched partition between gravity-separated streams of straw and grain thrown out by said beater and threshing cylinder and guiding said straw through the transverse arch therebeneath longitudinally of said straw deck and deflecting grain received thereon transversely either side of the straw moving therebeneath, and a deflecting surface projecting above said tunnel-like member to deflect grain thrown out by said beater and threshing cylinder above said tunnel-like member onto the upper surface thereof to be deflected thereby.

2. A device according to claim 1 in which means are provided to conduct the grain deflected by said tunnel-like member into said grain pan.

3. In a threshing machine or the like, including a threshing cylinder and concave therefor and straw deck, a transversely arched deflecting surface supported above and extending longitudinally of the straw deck to present a longitudinal arched passage therebeneath and spaced from said threshing cylinder to form a separating surface between the streams of grain and straw thrown out by the threshing cylinder and separated naturally through the difference in resistance offered by the air thereto, and means extending above said deflecting surface into the path of said grain stream for obstructing the flight of said grain stream to deflect same onto the aforesaid surface for recovery.

SILAS F. McPHAIL.

REFERENCES CITED

The following references are of record in the file of this patent:

UNITED STATES PATENTS

| Number | Name | Date |
| --- | --- | --- |
| D. 26,770 | Webber | Mar. 16, 1897 |
| 598,984 | Eves | Feb. 15, 1898 |
| 1,621,445 | Unruh | Mar. 15, 1927 |

FOREIGN PATENTS

| Number | Country | Date |
| --- | --- | --- |
| 428,286 | Germany | Apr. 28, 1926 |